April 25, 1939.　　T. W. KENYON ET AL　　2,155,421
SAFETY DEVICE FOR HYDRAULIC SERVOMOTORS
Filed Dec. 9, 1937　　2 Sheets-Sheet 2
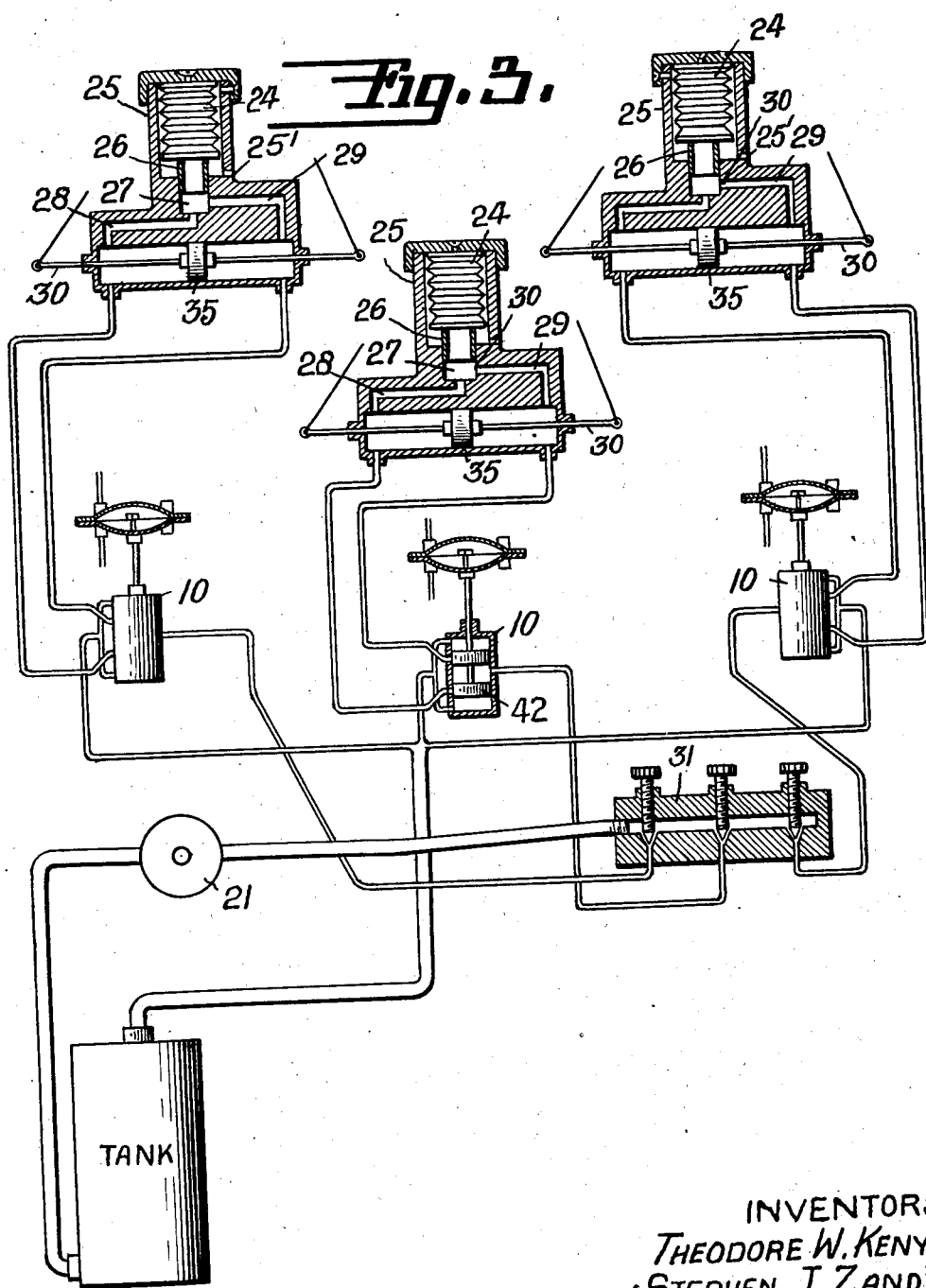
INVENTORS
THEODORE W. KENYON,
STEPHEN J. ZAND
BERT G. CARLSON
BY
THEIR ATTORNEY Patented Apr. 25, 1939

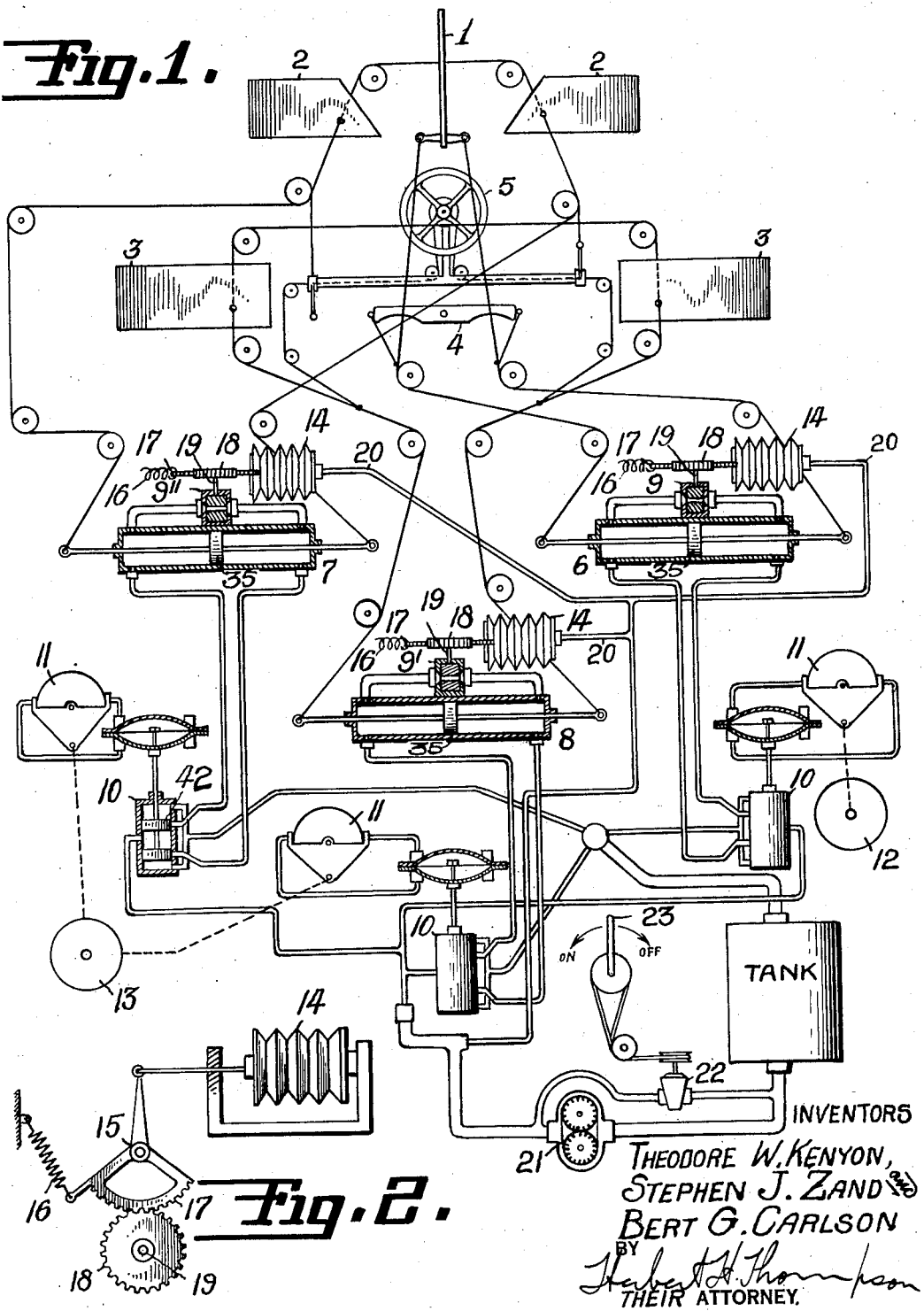

2,155,421

UNITED STATES PATENT OFFICE 2,155,421

SAFETY DEVICE FOR HYDRAULIC SERVO-MOTORS

Theodore W. Kenyon, Huntington, Stephen J. Zand, Forest Hills, and Bert G. Carlson, Freeport, N. Y., assignors to Sperry Gyroscope Company, Inc., Brooklyn, N. Y., a corporation of New York Application December 9, 1937, Serial No. 178,972

4 Claims. (Cl. 244—78)

This invention relates to hydraulic automatic pilots especially adapted for aircraft use. Our invention is shown specifically applied to the form of automatic pilot shown in the prior patent to Sperry, Carlson and Bates, #1,992,970, dated March 5, 1935, although it will be obvious that it has application to many other types of pilots and also to fluid pressure servo motors in general.

It is now found preferable to locate the servo motor or cylinder for each control surface adjacent thereto so as to reduce the length of the mechanical connections between the servo motor and surface. This necessitates separating the cylinders. On the other hand, it is essential to have means whereby the servo motor system may be thrown out of control instantly and simultaneously upon failure of the hydraulic pressure due to any cause, or at will of the aviator.

According to our invention, we provide an automatic means for bypassing the oil around the piston in the several servo cylinders, which is automatically opened by a drop in the pressure of the oil below a predetermined amount.

Referring to the drawings, showing two forms our invention may assume,

Fig. 1 is a diagram illustrating the connections for one form of the invention.

Fig. 2 is a detail of the pressure bellows which opens the bypass on failure of the oil pressure.

Fig. 3 is a diagram in even more elemental form than Fig. 1, showing a modified form of automatic bypass valve operating on a somewhat different principle than Fig. 1.

In Fig. 1, the several control surfaces, namely, the vertical rudder 1, the elevators 2, 2, and the ailerons 3, 3 are shown as manually operated from the steering pedal 4 and from the control wheel 5 through cables in the usual manner. Said surfaces are also severally controlled through their respective hydraulic servo motors 6, 7 and 8, which are also shown as connected through cables to the said surfaces. While it is usually possible to overpower the servo motors by the manual control, we also provide bypass valves 9, 9' and 9", one for each cylinder, so that the servo motor system may be rendered inoperative and the control surfaces moved directly by hand without any opposition from the servo system. Each cylinder is controlled from a relay valve 10 which, in turn, is operated by differential air pressure from pick-off means 11 on the directional gyroscope 12 in the case of the vertical rudder, or on the gyro vertical 13 in the case of the other controls.

For operating the bypass valves automatically, we have shown a spring collapsed bellows or sylphon 14 for each cylinder. Said bellows is shown as having its free end connected to a bell crank lever 15 (Fig. 2), which is normally rotated by a spring 16 to hold it in the collapsed position. The lever is shown as having segmental gear teeth 17 thereon, meshing with a pinion 18 on the stem 19 of the bypass valve 9, the bypass valve being closed when the bellows is collapsed. The interior of the bellows, however, is connected through a pipe 20 to the pressure side of the oil pump 21 so that as long as the pump pressure is maintained, each of the bellows is expanded and the bypass valve closed. If, however, the oil pressure for any reason fails, each of the bellows is collapsed by the respective spring and the bypass valves all opened simultaneously.

Manual control of said bypass valves may be effected from a master bypass valve 22 which bypasses the pump 21 and is controllable from a handle 23, so that when valve 22 is thrown to the open position, the entire hydraulic system is paralyzed and all bypass valves at the servo motors opened by the resulting drop in pressure.

In the form of the invention shown in Fig. 3, the pressure bellows 24 are incorporated in the structure of the cylinders, being housed within an extension 25 on the side thereof, having a drain 25'. Each bellows has extending from the lower side thereof a sleeve 26 which slides in a bore 27 in the cylinder wall. On one side of the piston 35, each cylinder is connected through a passage 28 to the bottom of said bore 27, and the other side 29 of the cylinder is connected to a side port 30 in bore 27. When the bellows is collapsed, the sleeve is raised so that the piston 35 is bypassed and is free to be moved by hand. When, however, the bellows is expanded by oil pressure within the same, the sleeve closes the port 30, thus closing the bypass.

In this form of the invention, the interior of the bellows is subjected to the variable cylinder pressure and not to the line pressure, as in Fig. 1, but the operation is similar because substantial pressure is present in both sides of the cylinder, no matter in which direction the piston is moving or whether it is standing still due to the pressure drop between the cylinder relay valve 10 and sump tank. Said valves are connected to two ports 40 and 41 at opposite ends of the cylinders, which become either intake or outlet ports according to whether the piston valve 42 of valve 10 is up or down. Therefore the sleeve may be designed so as to remain expanded until the pressure drops below the normal minimum operating pressure, in which case it will open to bypass the oil.

This form of the invention has the advantage that each cylinder may be bypassed independently by the operation of the so-called speed valves 31 which are used to regulate the velocity of oil flow to the cylinders. Thus, by shutting down any one of the speed valves, the servo motor in the line thereof will be bypassed, since by that means all pump pressure to the cylinder is shut off.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

Having described our invention, what we claim and desire to secure by Letters Patent is:

1. In a fluid pressure servo system for aircraft, a source of fluid pressure, a servo cylinder, a bypass valve therefor, a resilient metal bellows normally inflated by said pressure, means operatively connecting said bellows to said valve to normally hold said valve closed, and spring means for opening said valve when said pressure fails.

2. In a fluid pressure servo system for aircraft, a source of fluid pressure, a plurality of servo cylinders, a rotary bypass valve for each cylinder, metallic bellows means responsive to loss of pressure in the operating fluid for opening said valves, and manual means for substantially reducing said pump pressure to cause all said valves to open simultaneously.

3. In a hydraulic servo system for automatic pilots for dirigible craft, a hydraulic servo motor having two ports, valve means rendering one or the other of said ports an intake port and the other outlet, and vice versa, a bypass between said ports, a valve for normally maintaining said bypass closed, and metallic bellows means responsive to drop in pressure below the outlet pressure at at least one of said ports for opening said bypass valve.

4. An automatic hydraulic servo system for aircraft automatic pilots as claimed in claim 4, having a plurality of servo motors and a speed valve for each motor for regulating the rate of oil flow, whereby any bypass valve may be opened by closing the corresponding speed valve.

THEODORE W. KENYON.
STEPHEN J. ZAND.
BERT G. CARLSON.